United States Patent [19]

Prelas

[11] Patent Number: 5,114,661
[45] Date of Patent: May 19, 1992

[54] SOLID STATE LASER MEDIA DRIVEN BY REMOTE NUCLEAR POWERED FLUORESCENCE

[75] Inventor: Mark A. Prelas, Columbia, Mo.

[73] Assignee: The United States of America as represented by the United States Department of Energy, Washington, D.C.

[21] Appl. No.: 641,831

[22] Filed: Jan. 16, 1991

[51] Int. Cl.$^5$ ............................................... H01S 3/09
[52] U.S. Cl. ............................... 376/146; 376/147; 372/70; 372/73
[58] Field of Search ............... 376/326, 146, 147, 148; 372/70, 71, 73

[56] References Cited

U.S. PATENT DOCUMENTS

| | | | |
|---|---|---|---|
| 3,667,068 | 5/1972 | Morrison et al. | 372/73 |
| 4,160,956 | 7/1979 | Fader | 372/73 |
| 4,225,826 | 9/1980 | Lewis et al. | 372/70 |
| 5,022,043 | 6/1991 | Jacobs | 372/71 |

Primary Examiner—Brooks H. Hunt
Assistant Examiner—Frederick H. Voss
Attorney, Agent, or Firm—Mark P. Dvorscak; Robert J. Fisher; William R. Moser

[57] ABSTRACT

An apparatus is provided for driving a solid state laser by a nuclear powered fluorescence source which is located remote from the fluorescence source. A nuclear reaction produced in a reaction chamber generates fluorescence or photons. The photons are collected from the chamber into a waveguide, such as a fiber optic waveguide. The waveguide transports the photons to the remote laser for exciting the laser.

5 Claims, 2 Drawing Sheets

SOLID STATE LASER MEDIA DRIVEN BY REMOTE NUCLEAR POWERED FLUORESCENCE

CONTRACTUAL ORIGIN OF THE INVENTION

The United States Government has rights in this invention pursuant to Contract No. DE-AC07-76ID01570 between the U.S. Department of Energy and EG&G Idaho, Inc.

BACKGROUND OF THE INVENTION

This invention relates generally to the use of nuclear energy to power a laser, and is particularly directed to solid state laser media driven by remote nuclear-powered fluorescence sources.

Lasers driven directly by nuclear energy are referred to as Nuclear Pumped Lasers (NPL). The concept of an NPL is not new, however, only about 30 different NPLs have been identified. In contrast, there are several thousand lasers driven by electrical discharges. A nuclear pumped laser uses the reaction products from nuclear reactions to electronically excite a laser media. The direct use of nuclear energy to power a laser has been a topic of interest for many years. Since nuclear power scales very well, a laser driven by the direct use of nuclear energy has the potential to scale very well. The nuclear reactions most frequently employed in NPL experiments are: 1) $He^3(n,p)T$ {0.76 MeV energy release}; 2) $B^{10}(n,\alpha)Li^7$ {2.35 MeV energy release}; and 3) $U^{235}(n,vn)ff$ {200 MeV energy release}. There are other reactions which can be used as well, including $Pu^{239}(n,vn)ff$ {200 MeV energy release}.

Early NPLs used the gamma ray yield of a thermonuclear explosion as their sole energy source. A successful laser driven by neutrons from a nuclear reactor is disclosed in U.S. Pat. No. 3,952,263, Fission Fragment Excited Laser System, to McArthur et al.

It is well known to laser physicists that high power densities are necessary to drive most lasers because the lifetime of the upper laser state is usually short (about 1 ms). However, the means of interfacing the nuclear fuel to the laser media in conventionally driven NPLs leads to inherently low power densities (less than 10 $Kw/cm^3$). These low power densities in return are the limiting factor on the number of NPLs which can be discovered. On the other hand, electrically driven lasers can achieve power densities greater than 100 $Kw/cm^3$.

The limitations of conventionally driven NPLs can be overcome. Two new methods of interfacing the nuclear fuel to the laser have been developed which should allow many more NPLs to operate.

The first method, the transfer method, allows the nuclear energy to be transferred to an intermediate atomic or molecular species with a long lifetime. This intermediate species can be transported away from the nuclear energy source and mixed with a second medium. If the second medium is chosen correctly, then the energy from the intermediate atomic or molecular species can be collisionally transferred to generate the upper energy level. An example of the transfer method was achieved using $N_2(v=1)$ as the intermediate energy carrier and $CO_2$ as the laser medium.

The second method, the photolytic transfer method, allows the nuclear energy to be converted to fluorescence through the interaction of the reaction products with a surrounding medium. The basic idea of the photolytic transfer method evolved from unsuccessful attempts to directly drive the XeF(B-X) laser. An early experiment using the photolytic transfer method used an Argon excimer fluorescence source excited by the $B^{10}(n,\alpha)Li^7$ reaction and a $N_2O$ laser media to generate the $O(^1S)$ group VI laser. It was subsequently discovered that the XeF(B-X) laser produced copious amounts of narrow band fluorescence, but that the upper laser level lifetime was so short (about 17 ns), that the power density required to drive the laser was too high to achieve with conventional nuclear-pumping methods. Hence, the narrow band fluorescence efficiency was measured and found to be $11\pm5\%$. It was concluded that XeF(B-X) and excimers in general would be excellent fluorescers for photolytically driven laser experiments.

In an earlier development by the applicant and others, diffuse light from a volume source was coupled to the reactant, and a process for reactions other than the production of a laser (e.g. photochemical or photoelectric reactions) was used. This development, termed a nuclear-pumped energy focus, was used to drive high energy/power laser systems. A nuclear-pumped energy focus was disclosed in an article by M. A. Prelas and G. L. Jones, entitled Design Studies of Volume-Pumped Photolytic Systems Using a Photon Transport Code, published in H. Appl. Physics, 53(1), 165 (1982); in an article by M. A. Prelas and S. K. Loyalka, entitled A Review of the Utilization of Energetic Ions for the Production of Excited Atomic and Molecular States and Chemical Synthesis, published in Progress in Nuclear Energy, 8, 35–52 (1981); and in an article by M. A. Prelas et al., entitled Nuclear-Pumped Laser Research at the University of Missouri, published in Trans. Am. Nucl. Soc., 34, 810 (1980).

The present invention is an improvement in the concept of a photolytic transfer, nuclear-pumped laser. The invention utilizes an improved nuclear fluorescence source to drive a solid state laser remote from the nuclear fuel.

Accordingly, it is an object of the present invention to provide a solid state laser capable of being driven by remote nuclear powered fluorescence sources.

Another object of the present invention is the use of radiation hardened waveguides to channel the optical power emitted from the fluorescence source near the nuclear fuel to a remote radiation sensitive solid state laser.

It is another object of the present invention to use solid state lasers which have the lowest driver power requirements of any photolytically driven laser.

Yet another object of the present invention is the use of improved nuclear fluorescence sources.

SUMMARY OF THE INVENTION

To achieve the foregoing and other objects, this invention comprises a diffuse source of fluorescence in a radioactive environment and a means for channelling the fluorescence to a solid state laser located remote from the fluorescence source for exciting and driving the laser. The fluorescence source, which consists of photons, is generated by nuclear energy produced in a reaction chamber. An aperture is provided in the reaction chamber and a collection means located in the aperture collects the photons from the chamber. Means, such as an fiberoptic waveguide, is coupled to the collection means and transports the photons to the laser.

The reaction chamber contains nuclear fuel for producing nuclear energy, as well as a means for converting the nuclear energy to the fluorescence source. The converting means can be a mixture of gases proximal to the nuclear fuel; or a magnetically trapped uranium plasma at a high temperature and a high density. Additionally, the reaction chamber can be a vacuum chamber coated with reflective material, and the converting means can be a solid fuel element in the vacuum chamber mounted on a high temperature ceramic insulator.

BRIEF DESCRIPTION OF THE DRAWINGS

The above-mentioned and other features of the invention will become more apparent be best understood, together with the description, by reference to the accompanying drawings, in which.

DETAILED DESCRIPTION OF THE INVENTION

Figure 1:
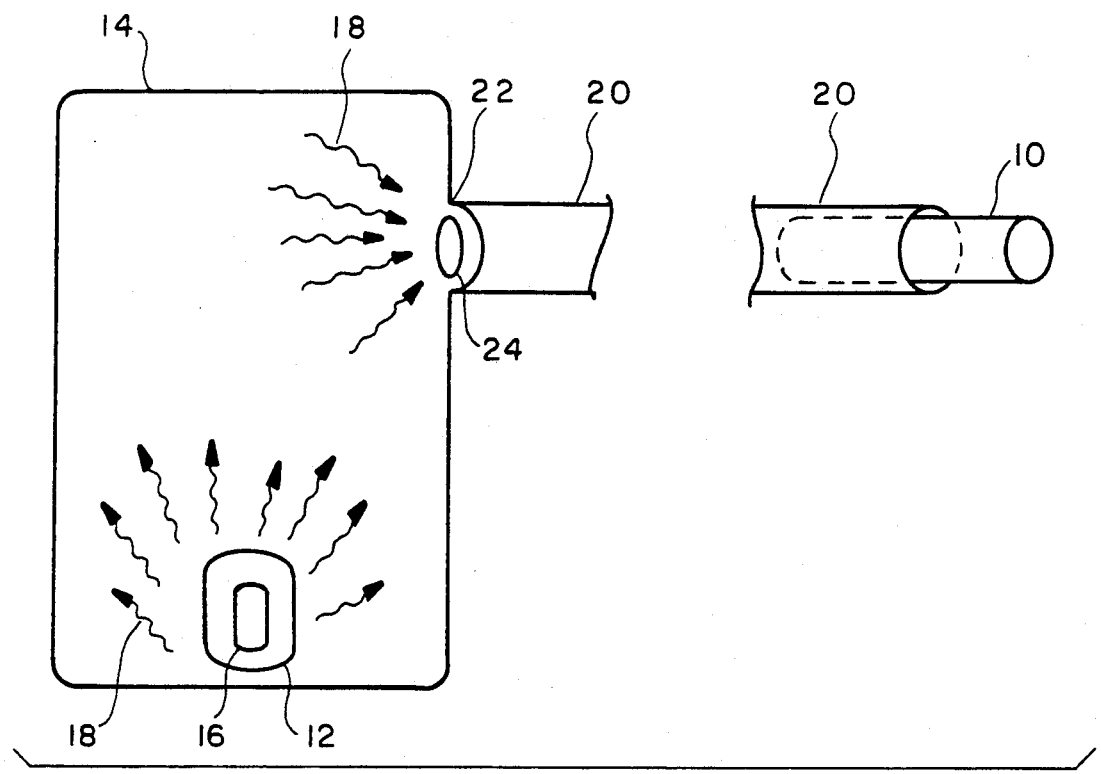
FIG. 1 shows a schematic representation of a remote, nuclear powered laser in accordance with the present invention.

Referring to FIG. 1, a schematic representation of a solid state laser 10 driven by a remote nuclear powered fluorescent source 12 in accordance with the present invention is shown. A nuclear reaction chamber 14 containing nuclear fuel 16 produces nuclear energy. The nuclear energy is converted to diffuse fluorescence, or photons, represented by curved arrows 18. As used herein, the generation of fluorescence means generally the product of the emission of electromagnetic radiation by a substance as a consequence of the absorption of energy by radiation, which may be either electromagnetic or particulate. The fluorescence 18 is channeled by a waveguide 20 to the solid state laser 10, which is located at a distance remote from the fluorescence source or radiation. This distance depends on the means used to generate the fluorescence. For example, when using nuclear energy, it is contemplated that the remote laser is located about 3 to 4 meters from the fluorescence source or from the radiation. The laser energy can then be extracted by well known means not shown, such as by forming an oscillator with mirrors and the solid state medium, or by using the solid state medium as an amplifier. For high energy systems, the latter method is desirable.

The significant aspect of the reaction chamber 14 is that it produces photons, generated from nuclear reactions, throughout the volume, and then transports these photons out of the chamber. To this end, the chamber is provided with an aperture 22. A means 24 is located in the aperture 22 to facilitate collection of the fluorescence from the chamber. The means 24 can be a lens, such as an optical lens, or a window. This means should be composed of material which is radiation hardened and capable of efficiently collecting the photons and transporting them from the reaction chamber. A preferred material is fused silica. For purposes of illustration, other materials that also can be used include sapphire, magnesium fluoride, and calcium fluoride.

The light being transported from the chamber 14 at the aperture 22 is diffuse. However, it is possible to collect this light and transport it to a laser remote from the chamber. Remote pumping produces visible to near infrared (IR) light in the absorption bands of typical solid state lasers. Accordingly, the interior surface of the chamber 14 should be composed of material which is transmissive and reflective to the visible to IR wavelengths. Metallic silver is one of the most effective reflector materials for visible to IR wavelengths and is highly radiation resistant. A silver reflector is superior to a dielectric reflector for diffuse sources as well. This is due to the random angle of incidence and random polarity of photons from a diffuse source. For randomly polarized light, the s and p-polarized components of light are sensitive to the angle of incidence to a reflective surface. For a dielectric reflector, the p-polarized light will be transmitted at Brewster's angle (56.9°). Metallic surfaces are preferable to dielectric surfaces because the p-reflectance reaches a minimum at the principle angle but does not drop to zero. For silver, the p-reflectance at the principle angle is about 95% in the visible range.

Various chamber geometries are effective in transporting the fluorescence 18 to the collection means 24 in the aperture 22. Cylindrical geometries are preferred since they are very efficient in photon transport out of the reaction cell. A cylinder having a relatively large length to radius ratio (e.g. 5:1) will transport nearly 90% of the photons created in the chamber out of the aperture 22.

An optical system and waveguide can efficiently collect fluorescence from a diffuse source in a radioactive environment. Preferably, the waveguide 20 should be radiation hardened. It is well known that fiberoptics are very efficient waveguides, and that fiberoptics made of high purity fused silica can withstand considerable radiation. A hollow core waveguide having its inner walls coated with silver will also be capable of withstanding considerable radiation.

Figure 2A:
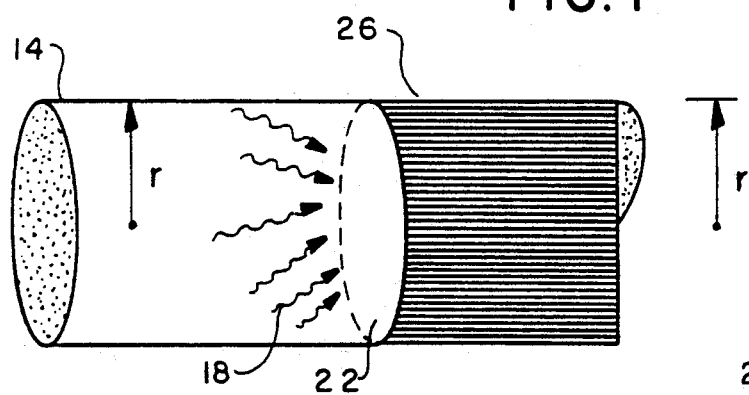
FIG. 2a shows a hemispherical optical collector.
Figure 2B:
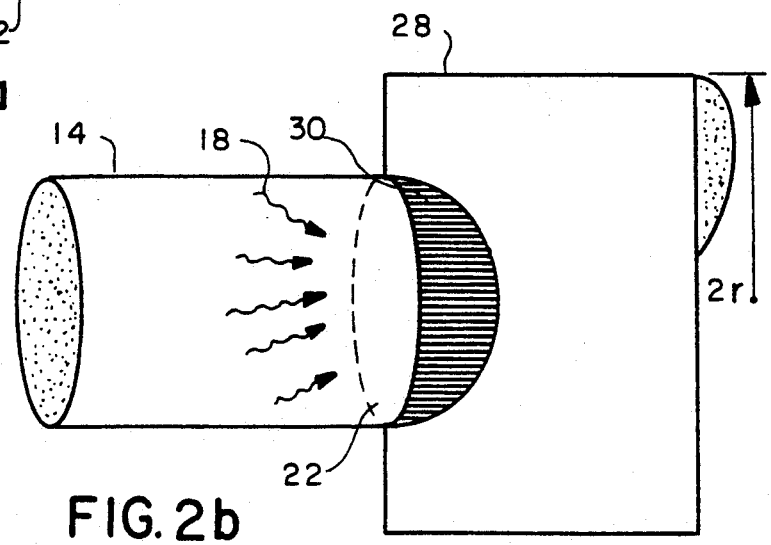
FIG. 2b shows a cylindrical optical collector.

FIGS. 2a and 2b show alternative arrangements of the optical waveguide 20, and the means for collecting the fluorescence 18 produced in the reaction chamber 14. Fiberoptic bundles of different shapes can collect fluorescence outside of the chamber aperture 22. FIG. 2a shows a cylindrical cross section fiber optic bundle 26 with a radius r equal to the radius of the aperture. A fiber optic bundle as depicted in FIG. 2a, having a packing fraction of 0.9 (for a bundle made with 1000 μm core, 1035 μm diameter fiberoptics), and an acceptance angle of 30°, will have a collection efficiency of about 28%.

FIG. 2b illustrates a more efficient collection system than that shown in FIG. 2a. A hemispherical surface 28 has fibers mounted normal to its surface. A hemispherical collector 30 with a radius r equal to twice that of the aperture 22, a packing fraction of 0.9, and an acceptance angle of 30°, will have a collection efficiency of about 72%.

Figure 3:
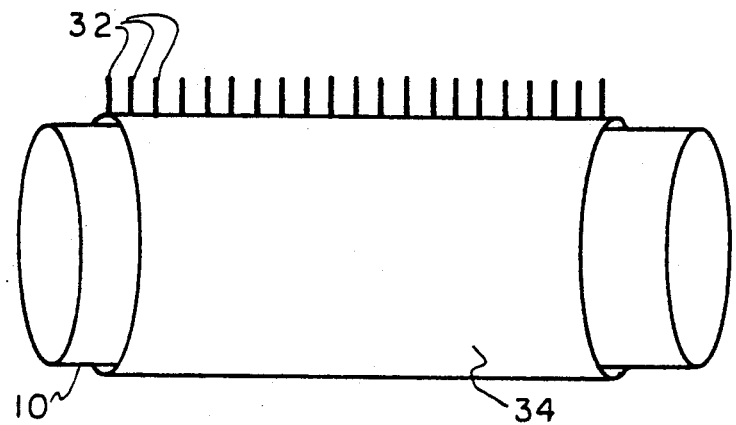
FIG. 3 shows a fiberoptic waveguide to laser coupling.

There are several ways for coupling the fluorescence collected in the waveguide to the solid state laser, and one possibility is shown in FIG. 3. Individual optic fibers 32, which comprise the fiber optic bundles 26 or 30, are mounted normal to the surface of a cylindrical sleeve 34. The sleeve 34 fits over the laser 10. Other configurations for mounting fibers to solid state lasers are possible. These configurations may be advantageous when attempting to design a high average power laser system. For example, the use of a disk amplifier may be required in multimegajoule solid state laser designs.

The preferred laser 10 to be driven by the remote nuclear fluorescence is the Nd:Glass laser. By cooling a Nd:Glass disk along the optical plane and by placing a coating on the disk's sides to eliminate parasitic oscillation, it is possible to achieve an average laser power of 0.54 Watts/cm$^3$ at a frequency of 1060 nm. The laser can actually store more energy than 0.54 Watts/cm$^3$, about 1.8 Watts/cm$^3$, but parasitic oscillations determine this limit. This power can be extracted in a relatively short pulse (18 nanoseconds) because the Nd:Glass laser has a long upper laser lifetime (230 ms) which will allow the energy to be stored for about 200 ms. It is possible then, to pulse the laser at a high repetition rate and extract the energy in a series of short pulses. Additionally, the Nd:Glass laser can be frequency doubled (530 nm) and frequency tripled (353 nm). These attributes of Nd:Glass are well established and well known to practitioners in the art due to studies of the laser medium by researchers in laser fusion. However, solid state materials other than Nd:Glass may be identified in the future which achieve greater performance, and such other materials should be able to be driven in accordance with the invention disclosed herein.

Solid state lasers require fluorescence or photons in the visible to infrared (IR) range, and there are many possible ways to interface the fuel 16 to the laser 10 to obtain these photons.

One method is to use gases or a mixture of gases similar to those used in electrically driven Xenon flashlamps. Such gases could include pure Xenon or a mixture of Xenon and Helium. Gases capable of forming excimer states can also be used. This mixture can be placed in the proximity of the fuel by one of several known methods, e.g. by the aerosol core reactor concept. The ions from the nuclear reactions will produce fluorescence in the gas mixture. Much of the spectrum will be made up of a continuum from the Saha regime. Electrically driven flashlamps can vary the plasma temperature in order to shift the spectrum into the IR and thereby adjust the fraction of radiation which lies within the absorption band. A nuclear driven flashlamp will not have good control over temperature, but the spectrum can be driven into the IR by the addition of impurities such as nitrogen or oxygen. Adjustment of gas mixtures may be used to identify good candidate mixtures.

Figure 4:
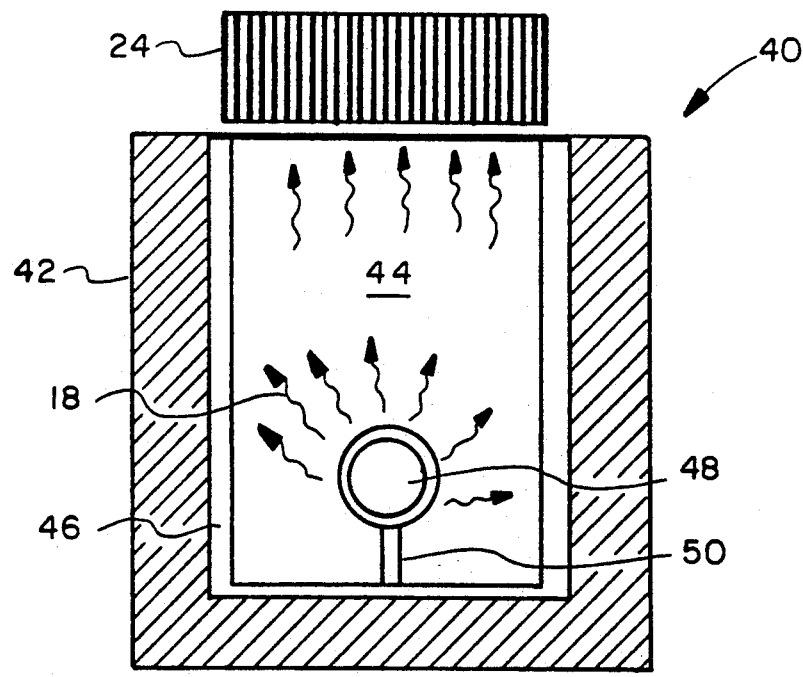
FIG. 4 shows a radiative cooled blackbody fluorescer.

Another embodiment for interfacing the fuel to the fluorescer is illustrated in FIG. 4, and employs a radiative cooled blackbody fluorescer, i.e., where a solid fuel element is cooled only by radiative heat transport. This method differs from others because its only means of heat transport is radiative cooling. Other methods use both radiative and convective cooling on the fuel and cladding. Referring to FIG. 4, there is shown a radiative cooled blackbody fluorescer 40. The fluorescer 40 includes a moderator 42 surrounding a vacuum chamber 44. A cooling water channel 46 is disposed between the chamber and the moderator. A fuel element with a tungsten cladding 48 is placed in the vacuum chamber 44 and mounted on a high temperature refractive ceramic insulator 50. The vacuum chamber is coated with a reflective material, e.g. silver, so that visible to IR radiation is efficiently transported to the optical collector 24. A 4000K black-body radiator can produce significant radiation (up to 20%) in the absorption bands of the Nd:Glass laser. Preferably, fuel element 48 includes a tungsten cladding material with UO$_2$ as the fuel is the preferred fuel and cladding. Tungsten is an excellent gray body emitter of radiation, and closely approaches black-body emission. Tungsten has a melting temperature of 3800K, and UO$_2$ fuel has a melting temperature of 3000K (the boiling temperature of UO$_2$ fuel is 6000K). At a temperature of 3500K, the UO$_2$ fuel will be a liquid, but the tungsten will still be a solid. Heat from the fuel will be transferred to the tungsten cladding and the cladding will in turn radiate heat. At a temperature of 3500K, the heat transfer rate from the fuel will be about 9 MW/m$^2$. This method can result in a Nd:Glass laser with a system efficiency (energy emitted by laser per energy produced by the fuel) of 4.7%. Hence, a 1 MW average power Nd:Glass laser system will require a reactor with a volume of 1.7 m$^3$ and a thermal power of 22 MW. The minimum fuel loading required is 20 kg of U$^{235}$. The average neutron flux obtained from a power balance is $3 \times 10^{13}$ cm$^{-2}$s$^{-1}$. This flux is well within the operating range of present day reactor designs.

A further embodiment for interfacing the fuel to the fluorescer is to generate a magnetically trapped uranium plasma at high temperatures (about 7000K), and high densities (about $1 \times 10^{19}$ ions-cm$^{-3}$. Even though a high density, high Z plasma is not a particularly good blackbody emitter, it is expected that the combination of line radiation and Saha continuum will provide a spectra rich in the visible and IR wavelengths. This blackbody radiation can be collected and transmitted by the optical waveguide to a solid state lasing device.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described to best explain the principles of the invention and its practical application and thereby enable others skilled in the art to best utilize the invention in various embodiments and with various modifications as are suited to the particular use contemplated. It is intended that the scope of the invention be defined by the claims appended hereto.

The embodiments of the invention in which exclusive property rights or privileges are claimed are defined as follows:

1. An apparatus for driving solid state laser media by a remote nuclear-powered source comprising:
   a) a nuclear reaction chamber producing diffuse fluorescence in the visible to infrared range, the reaction chamber including an aperture containing a lens capable of collecting the diffuse fluorescence from the reaction chamber, and further wherein the reaction chamber has an interior surface coated with material which is reflective and transmissive to visible to near infrared light such that the diffuse fluorescence collected in the reaction chamber by the lens is in the absorption bands of the remote solid state laser;
   b) channeling means for channeling the fluorescence from the reaction chamber to the remote laser; the channeling means including a waveguide adjacent to the lens for channeling the collected fluorescence from the lens to the remotely located laser and,
   c) coupling means for coupling the fluorescence to the laser such that the fluorescence is absorbed into the laser and pumps the laser.

2. The apparatus of claim 1 wherein the waveguide is a radiation hardened fiber optic waveguide.

3. The apparatus of claim 2 wherein the reaction chamber has a cylindrical geometry having a relatively large length to radius ratio.

4. The apparatus of claim 3 wherein the fluorescence collected from the reaction chamber and transmitted through the waveguide is coupled to the remotely-located laser by a plurality of optic fibers mounted normal to the surface of a cylindrical sleeve which surrounds the laser, whereby fluorescence from the optic fibers is absorbed by the laser.

5. The apparatus of claim 4 wherein the laser is Nd:Glass.

* * * * *